(12) United States Patent
Yasuhara

(10) Patent No.: US 8,182,384 B2
(45) Date of Patent: May 22, 2012

(54) POWER TRANSMISSION CHAIN AND POWER TRANSMISSION APPARATUS

(75) Inventor: Shinji Yasuhara, Yamatokoriyama (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 458 days.

(21) Appl. No.: 12/010,693

(22) Filed: Jan. 29, 2008

(65) Prior Publication Data

US 2008/0182692 A1    Jul. 31, 2008

(30) Foreign Application Priority Data

Jan. 30, 2007 (JP) ............................... P2007-018777

(51) Int. Cl.
*F16G 11/02* (2006.01)
(52) U.S. Cl. ....................................................... 474/226
(58) Field of Classification Search .......... 474/202–236; 59/1–95
See application file for complete search history.

(56) References Cited

U.S. PATENT DOCUMENTS

| 5,114,384 A | 5/1992 | Tsuyama |
| 5,645,503 A | 7/1997 | Okuda et al. |
| 5,989,141 A | 11/1999 | Kozakura et al. |
| 6,485,385 B2 * | 11/2002 | Shimaya ........................ 474/213 |
| 7,404,778 B2 * | 7/2008 | Butterfield ..................... 474/212 |
| 2007/0149331 A1* | 6/2007 | Yasuhara et al. ............... 474/215 |
| 2007/0197331 A1* | 8/2007 | Junig et al. ..................... 474/215 |
| 2007/0238566 A1* | 10/2007 | Miura ............................ 474/245 |

FOREIGN PATENT DOCUMENTS

| EP | 1719933 A1 * | 8/2006 |
| EP | 1 719 933 A1 | 11/2006 |
| JP | 633545 U * | 1/1988 |
| JP | 2005-233275 | 9/2005 |

OTHER PUBLICATIONS

Yutaka Tatari, Translation of JP-63-003545 Power Transmission, Jan. 2010, Schreiber Translations Inc., PTO 10-1864, pp. 7, 8, 11, 22, and 23.*
European Search Report dated Sep. 21, 2009.

* cited by examiner

*Primary Examiner* — Michael Mansen
*Assistant Examiner* — Robert Reese
(74) *Attorney, Agent, or Firm* — McGinn IP Law Group, PLLC

(57) ABSTRACT

A gap with a predetermined size is formed between adjacent links arranged in a chain width direction, the size of the gap is set smaller than a maximum warpage amount of the links.

4 Claims, 5 Drawing Sheets

POWER TRANSMISSION CHAIN AND POWER TRANSMISSION APPARATUS

BACKGROUND OF THE LOCATION

1. Field of the Invention

This invention relates to a power transmission chain, and more particularly to a power transmission chain and a power transmission apparatus suited for a continuously variable transmission (CVT) of a vehicle such as an automobile.

2. Related Art

As a continuously variable transmission for an automobile, there is known the type (as shown in FIG. 5) which comprises a driving pulley 2 having a fixed sheave 2a and a movable sheave 2b and operatively connected to an engine, a driven pulley 3 having a fixed sheave 3b and a movable sheave 3a and operatively connected to a drive wheel, and an endless power transmission chain 1 extending around the two pulleys. Each movable sheave 2b, 3a is moved toward and away from the corresponding fixed sheave 2a, 3b by a hydraulic actuator, and by doing so, the chain 1 is clamped by hydraulic pressure, and by this clamping force, a contact load is caused to develop between each pulley 2, 3 and the chain 1, and a torque is transmitted by a frictional force of this contact portion.

In JP-A-2005-233275 Publication, there is proposed a power transmission chain which comprises a plurality of links having front and rear insertion through holes for the passage of pins therethrough, and a plurality of first pins and a plurality of second pins which are arranged on front and rear sides to interconnect the links arranged in a width of the chain in such a manner that the front insertion through hole of one link corresponds to the rear insertion through hole of other link. The first pins and the second pins move relatively in rolling contact with each other so that the links can be bent relative to each other in a chain length direction. One of the first pin and the second pin is fixedly fitted in the front insertion through hole of one link and movably fitted in the rear insertion through hole of the other link and the other of the first pin and the second pin is movably fitted in the front insertion through hole of the one link and fixedly fitted in the rear insertion through hole of the other link.

According to the power transmission chain shown in JP-A-2005-233275 Publication, it is preferable that a gap is formed between adjacent links arranged in the chain width direction, because if no gap is formed between the adjacent links, the links tend to be worn due to friction force caused by contact between the adjacent links. However, if the chain is configured in such a manner, a problem has been often caused that vibration and noise are increased in the chain, since the friction force between the adjacent links is not generated which serves as deterrent force when string vibration is generated in the chain.

SUMMARY OF THE INVENTION

It is an object of this invention to provide a power transmission chain and a power transmission apparatus in which occurrence of wear in links is suppressed while a frictional force is generated between the links to suppress a vibration among the links by adjusting the contact between the links in a suitable amount.

According to the invention there is provided a power transmission chain comprising:

a plurality of links each having front and rear insertion through holes for the passage of pins therethrough;
a plurality of first pins; and
a plurality of second pins;

wherein the first pins and the second pins are arranged in a forward-rearward direction, and interconnect the links arranged in a chain width direction such that the front insertion through hole of one link corresponds to the rear insertion through hole of other link, and the first pin and the mating second pin move relative to each other in rolling contact with each other so that the links can be bent relative to each other in a chain length direction, and one of the first pin and the second pin is fixedly fitted in the front insertion through hole of one link and movably fitted in the rear insertion through hole of the other link and the other of the first pin and the second pin is movably fitted in the front insertion through hole of the one link and fixedly fitted in the rear insertion through hole of the other link, wherein a gap with a predetermined size is formed between adjacent links arranged in the chain width direction, the size of the gap is set smaller than a maximum warpage amount of the links.

Preferably, the size of the gap is set within a range of 10% to 80% of the maximum warpage amount of the links.

Further, preferably, the size of the gap is set within a range of 10% to 50% of the maximum warpage amount of the links.

Further, preferably, the size of the gap is set within a range of 20% to 45% of the maximum warpage amount of the links.

In the invention as described above, the "gap" means a design gap which should be formed when no warpage is occurred in the links. The gap between the links is set by locating the links at predetermined positions when the links are secured (press-fitted) to the pins.

The links are manufactured though processes such as pressing, heat treatment and surface treatment etc. As a result, a warpage is occurred in a link. The warpage amount varies depending on the links. Conventionally, when the gap is set between adjacent links, a care for the gap has been performed so that the links are not brought into contact with each other even if the links have large warpage. On the other hand, in the invention, the size of the gap is set smaller than the maximum warpage amount of the links. (Incidentally, the size of the gap should not be 0.) In other words, the structure of the invention positively allows that a contact between adjacent links is partially occurred in the chain due to the warpage of the links. Preferably, the size of the gap is set within a range of 10% to 80% of the maximum warpage amount of the links. The maximum warpage amount of the links can be determined by measuring the warpage amount for a predetermined number of the links. For example, when the maximum warpage amount is 50 μm, the size of the gap may be set to a suitable amount smaller than 50 μm (preferably a suitable amount between 5 to 40 μm), like 20 μm or 30 μm. If the size of the gap is smaller than 10% of the maximum warpage amount, the friction force between the links can be considerably large so that the links can be easily worn. If the size of the gap is larger than 80% of the maximum warpage amount, the friction force can be too small to obtain vibration suppression effect. Tanking into account of the vibration suppression effect as an important factor, it is preferable that the size of the gap is set within a range of 10% to 50% of the maximum warpage amount. More preferably, the size of the gap may be set within a range of 20% to 45% of the maximum warpage amount.

Even though the warpage of the links varies depending on the links, by setting the gap of the links as described above, if links which have relatively large warpage are adjacently arranged, these links are brought into contact with each other, and on the other hand, if links which have relatively small warpage are adjacently arranged, these links are not brought into contact with each other. If a link having a large warpage and a link having a small warpage are adjacently arranged, they are brought into slight contact each other occasionally depending on these warpage amounts. As a result, in the chain as a whole, a friction force is generated between links to provide a damping effect to vibration serving as a resisting force against the string vibration in the chain. In addition, even though adjacent links are partially brought into contact, the contact is not generated entirely on the surfaces of the links. Accordingly, excessive friction force is not generated between the links so that wear of the links is avoided and power transmission efficiency is not deteriorated significantly. Thus, by positively utilizing varying warpage among the links, a suitable amount of friction force between links can be obtained in the chain.

In the power transmission chain of the invention, at least one of the first pins and the second pins contact the pulley, and power is transmitted by a frictional force. In the type of chain in which one of first pins and second pins contact pulleys when this chain is used in a continuously variable transmission, and those pins which contact the pulleys are called "pins", and will hereinafter be referred to as "first pins" or "pins", while those pins which do not contact the pulleys are called "inter-pieces" or "strips", and will hereinafter be referred to as "second pins" or "inter-pieces".

Each link is made, for example, of spring steel or carbon tool steel. The material of the link is not limited to spring steel and carbon tool steel, and any other suitable steel such as bearing steel can be used. The link may be of the type (pillared link) in which the front and rear insertion through holes are defined respectively by two independent through holes, or may be of the type (non-pillared link) in which the front and rear insertion through holes are defined by a single through hole. As a material for the pins, suitable steel such as bearing steel is used.

The fixing of the pins to the front and rear insertion through holes is effected by fit fixing of the outer peripheral surfaces of the pins to the inner edges of the insertion through holes, for example, by mechanical press fit. However, instead of this fit fixing, shrinkage fit or expansion fit can be used. In one insertion through hole, the first pin and the second pin are fitted so as to be opposed to each other along the chain length direction such that one of the pins is fixedly fitted to the peripheral surface of the insertion through hole. The fit fixing is preferably accomplished by edge portions at locations (edge portions at top and bottom) perpendicular to a lengthwise direction of the insertion through hole. After the fit fixing, pretension is applied in a pretension applying process, thereby applying a proper residual compressive stress uniformly to the pin fixing portion (pin press-fit portion) of the link.

The first pin and the second pin may be configured as follows, for example. One of the first pin and the second pin is provided with a flat face as rolling contact surface and the other of the first pin and the second pin is provided with a curved face as rolling contact surface with a predetermined profile, so that the first pin and the second pin are relatively movable while being brought into rolling contact with each other. Alternatively, both of the first pin and the second pin may be provided with curved faces as rolling contact surfaces with predetermined profiles. In both cases, two different kinds of pairs of the pins having different locus of movement with rolling contact may be provided, by providing two different kinds of rolling contact surface shapes for each of the first pin and the second pin (a relatively large curvature and a relatively small curvature). An example of the traces of the movement with rolling contact between the first pin and the second pin may be an inviolate curve.

In the present specification, although one end of the link in its longitudinal direction is called "the front (forward side)" while the other end is called "the rear (rearward side)", the terms "the front and rear" are used for convenience' sake, and do not mean that the lengthwise direction of the link is always in agreement with the forward-rearward direction.

In the above power transmission chain, preferably, one (inter-piece) of the mating pins is shorter than the other pin (pin), and the opposite end surfaces of the longer pin contact conical sheave surfaces of each pulley, respectively, in the continuously variable transmission, and power is transmitted by a frictional force due to this contact. Each pulley includes a fixed sheave having the conical sheave surface, and a movable sheave having the conical sheave surface opposed to the sheave surface of the fixed sheave. The chain is gripped between the sheave surfaces of the two sheaves, and the movable sheave is moved by a hydraulic actuator so as to change the distance between the opposed sheave surfaces in the continuously variable transmission and hence the radius of winding of the chain around the pulley, thereby smoothly changing the speed in a stepless manner.

According to another aspect of the invention, there is provided a power transmission apparatus comprising a first pulley having conical sheave surfaces, a second pulley having conical sheave surfaces, and a power transmission chain extending around the first and second pulleys. As the power transmission chain of this apparatus, the power transmission chain of the above construction is used.

In such a power transmission apparatus, a misalignment (misalignment in an axial direction of the pulleys between a center line of width direction in the first pulley and a center line of width direction in the second pulley) is caused by varying a speed change ratio. This misalignment is preferably set to be a maximum amount at the speed change ratio of 1:1, and 0 at an under-drive state. By this setting, vibration reduction effect and noise reduction effect can be enlarged particularly in a range of the speed change ratio frequently used.

This power transmission apparatus is suitably used in a continuously variable transmission of a vehicle such as an automobile.

According to a power transmission chain and a power transmission apparatus of the invention, by utilizing the warpage of the links caused at manufacturing, a suitable amount of friction force between links can be obtained. Therefore, occurrence of wear in links can be suppressed and a frictional force can be generated between the links to suppress a vibration among the links.

DETAILED DESCRIPTION OF THE PREFERRED EMBODIMENTS

A preferred embodiment of the present invention will now be described with reference to the drawings. In the following description, the upper and lower sides correspond to the upper and lower sides in FIG. 2.

Figure 1:
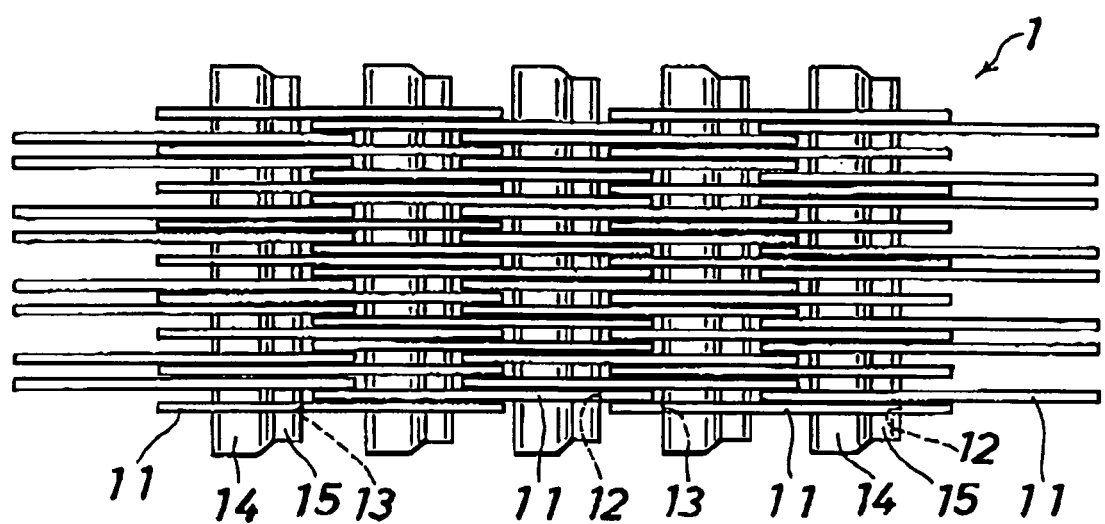
FIG. 1 is a plan view showing a portion of one preferred embodiment of a power transmission chain of the present invention.

FIG. 1 shows part of a power transmission chain of the present invention, and this power transmission chain 1 comprises a plurality of links 11 each having front and rear insertion through holes 12 and 13 (through holes) spaced a predetermined distance from each other in a chain length direction, and a plurality of pins (first pins) 14 and a plurality of inter-pieces (second pins) 15 which interconnect the links 11 arranged in a chain width direction so that the links 11 can be bent relative to each other in the chain length direction. The inter-piece 15 is shorter than the pins 14, and each inter-piece 15 and the mating pin 14 are opposed to each other in such a manner that the inter-piece 15 is disposed at the front side while the pin 14 is disposed at the rear side.

Three link rows each comprising a row of links 11 disposed in phase with each other in the chain width direction are arranged in an advancing direction (forward-rearward direction) to form one link unit, and a plurality of link units each comprising the three link rows are interconnected in the advancing direction to form the chain 1. In this embodiment, one link row comprising nine links 11 and two link rows each comprising eight links 11 jointly form one link unit.

Figure 4:
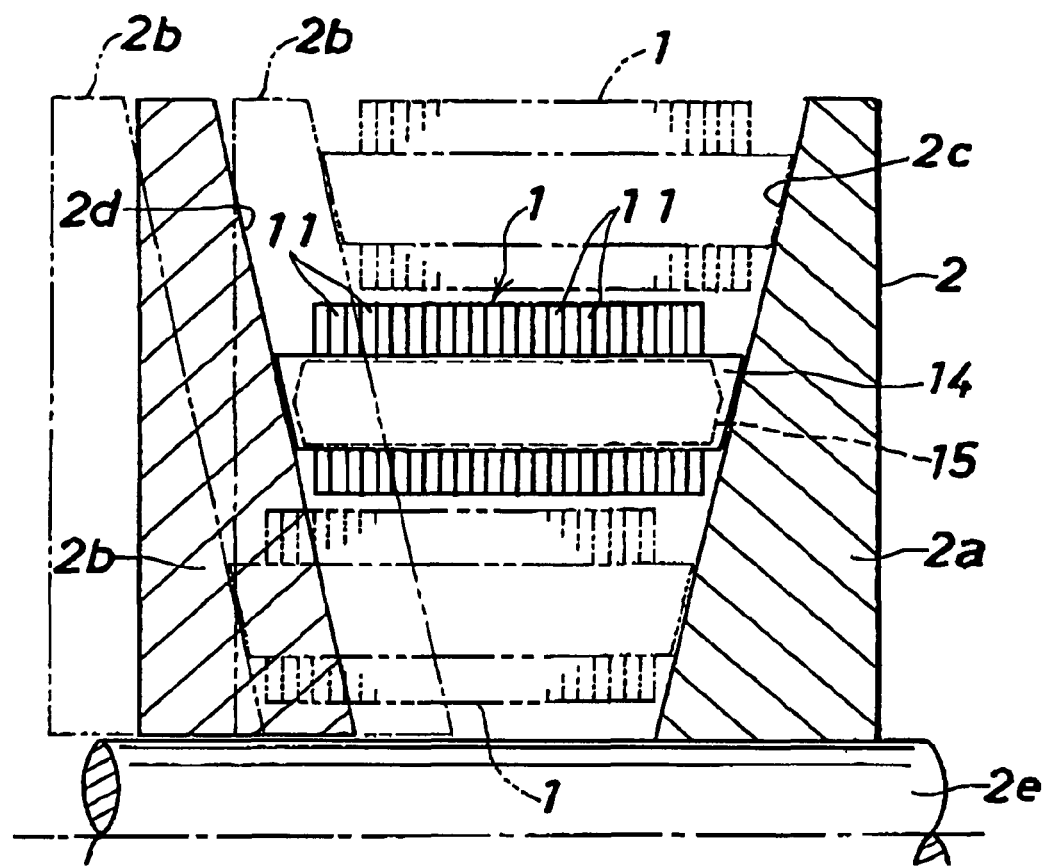
FIG. 4 is a front-elevational view showing a condition in which the power transmission chain is mounted on a pulley.
Figure 5:
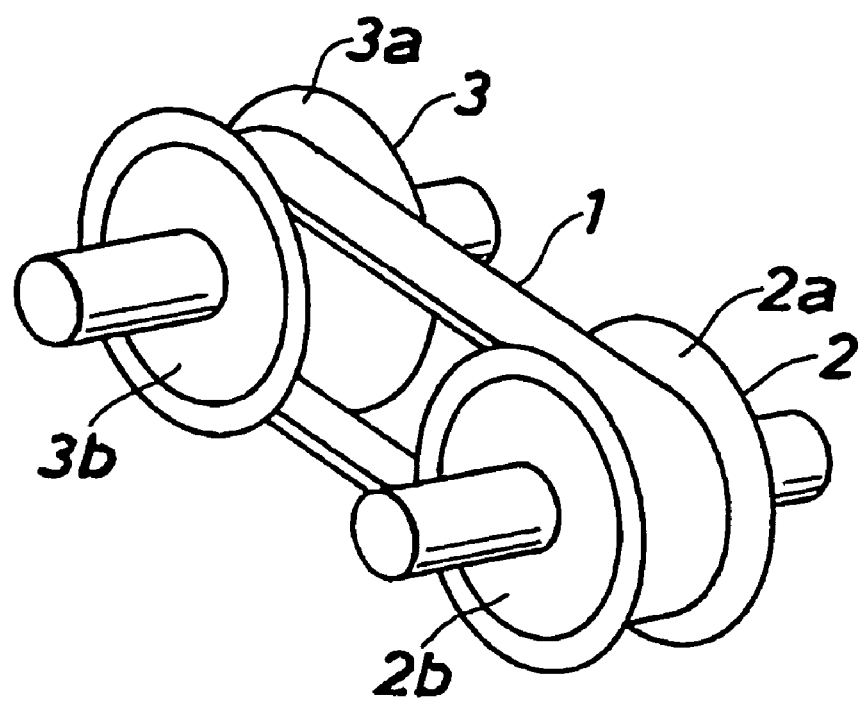
FIG. 5 is a perspective view showing a continuously variable transmission as an example in which a power transmission chain according to the invention is used.

The above power transmission chain 1 is used in a V-shaped section CVT shown in FIG. 4. At this time, the opposite end surfaces of each pin 14 are brought into contact respectively with conical sheave surfaces 2c and 2d of a fixed sheave 2a and a movable sheave 2b of a pulley 2 having a pulley shaft 2e, while the opposite end surfaces of each inter-piece 15 do not contact the conical sheave surfaces 2c and 2d. Power is transmitted by a frictional force of this contact.

Figure 2:
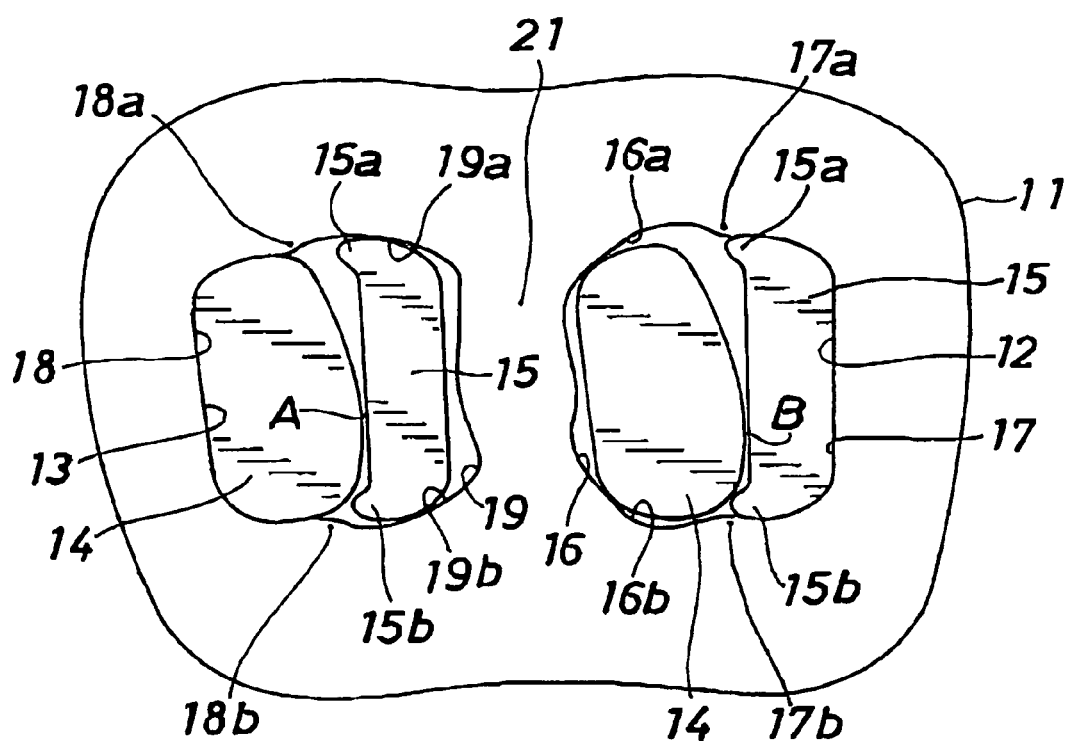
FIG. 2 is an enlarged side-elevational view of a link and pins.

As shown in FIG. 2, a pillar portion 21 is interposed between the front insertion through hole 12 and the rear insertion through hole 13 of the link 11. The front insertion through hole 12 includes a pin movable portion 16 in which the pin 14 is movably fitted, and an inter-piece fixing portion 17 to which the inter-piece 15 is fixed. The rear insertion through hole 13 includes a pin fixing portion 18 to which the pin 14 is fixed, and an inter-piece movable portion 19 in which the inter-piece 15 is movably fitted.

Each of the pins 14 is larger in width (in the forward-rearward direction) than the inter-piece 15. Projecting edge portions 15a and 15b are formed respectively at upper and lower edges of the inter-piece 15, and extend toward the mating pin 14.

Regions designated respectively by reference characters A and B in FIG. 2 respectively indicate lines (points in cross-section) at which the pins 14 contact the respective inter-pieces 15 at the straight portion of the chain 1. The distance between the regions A and B is the pitch.

For interconnecting the links 11 arranged in the chain width direction, the links 11 are stacked together in such a manner that the front insertion through hole 12 of one link 11 corresponds to the rear insertion through holes 13 of other link 11, and the pin 14 is fixed to the rear insertion through hole 13 of one link 11 and also is movably fitted in the front insertion through holes 12 of other link 11, while the inter-piece 15 is movably fitted in the rear insertion through hole 13 of the one link 11 and also is fixed to the front insertion through holes 12 of the other link 11. Then, each pin 14 and the mating inter-piece 15 move relative to each other in rolling contact with each other so that the links 11 can be bent relative to each other in the chain length direction (the forward-rearward direction).

Upper and lower convex generally-arc-shaped holding portions 18a and 18b for holding the pin 14 fixed to the pin fixing portion 18 are formed at a boundary portion between the pin fixing portion 18 and the inter-piece movable portion 19 of the link 11, and are continuous respectively with upper and lower concave generally-arc-shaped guide portions 19a and 19b of the inter-piece movable portion 19. Similarly, upper and lower convex generally-arc-shaped holding portions 17a and 17b for holding the inter-piece 15 fixed to the inter-piece fixing portion 17 are formed at a boundary portion between the inter-piece fixing portion 17 and the pin movable portion 16, and are continuous respectively with upper and lower concave generally-arc-shaped guide portions 16a and 16b of the pin movable portion 16.

A locus of a position of contact between the pin 14 and the inter-piece 15 obtained when using the pin 14 as a reference is an involute line, and in this embodiment the contact surface of the pin 14 has an involute shape (in cross-section) having a base circle with a radius Rb and a center M, and the contact surface of the inter-piece 15 is a flat surface (having a straight cross-sectional shape). With this construction, when each link 11 shifts from a straight portion to a curved portion of the chain 1 or from the curved portion to the straight portion, the pin 14 in the front insertion through hole 12 moves within the pin movable portion 16 relative to the mating inter-piece 15 held in the fixed condition while its rolling contact surface moves in rolling contact (including slight sliding contact) with the rolling contact surface of the inter-piece 15. At this time, in the rear insertion through hole 13, the inter-piece 15 moves within the inter-piece movable portion 19 relative to the pin 14 held in the fixed condition while its contact surface moves in rolling contact (including slight sliding contact) with the rolling contact surface of the pin 14.

For producing this power transmission chain 1, a required number of pins 14 and a required number of inter-pieces 15 are held upright on a bed, and thereafter the links 11 are press fitted relative thereto either one by one or several at a time. In this press-fitting operation, the upper and lower edge portions of the pin 14 are press-fitted respectively to the upper and lower edge portions of the pin fixing portion 18, and similarly the upper and lower edge portions of the inter-piece 15 are press-fitted respectively to the upper and lower edge portions of the inter-piece fixing portion 17. This press-fitting interference is 0.005 mm to 0.1 mm.

Figure 3A:
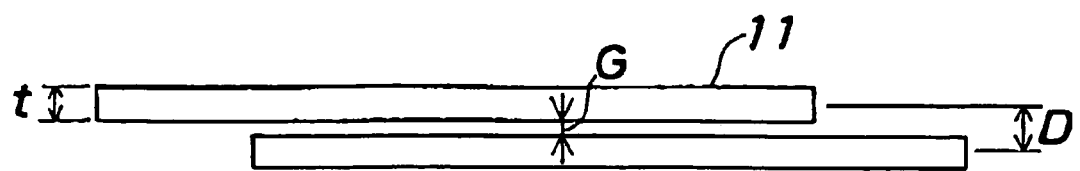
FIG. 3A and FIG. 3B are schematic views of gaps between the links.

As shown in FIG. 3A, when the links 11 are positioned for press-fitting process, a gap G is set between the links 11 which have a thickness t, respectively, such that that a distance D between center lines of the links 11 in thickness direction satisfies: $D = t + G$.

Figure 3B:
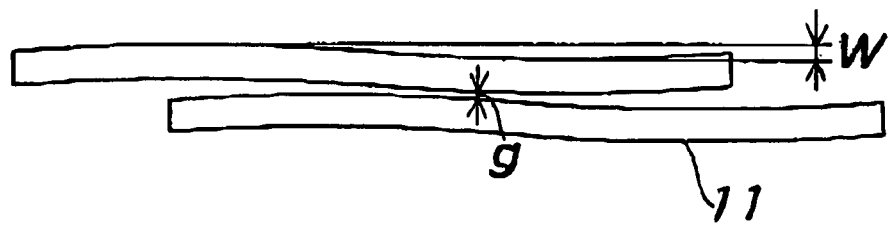

The links 11 are manufactured though processes such as pressing, heat treatment and surface treatment etc. As a result, a warpage is occurred in a link 11. As shown in FIG. 3B, (the figure shows the warpage with exaggeration), when the warpage amount W is present, an actual gap g (made by incorporating the warpage amount W at manufacturing to the design gap G) becomes small. The gap g can be made a minus amount (namely, the links 11 are brought into contact with each other with elastic force of the warpage). The warpage of the links varies depending on the links 11. For example, when the thickness of the links 11 is 1 mm, the warpage amount W varies from a minimum of 0, to a maximum of approximately 50 μm, and the average amount is in a range of approximately 20 to 30 μm.

In the power transmission chain 1, based on the warpage amount of the links 11, the size of the gap G is set smaller than a maximum warpage amount of the links 11 that is obtained by measuring the warpage amount for a predetermined number of the links 11. (Incidentally, the size of the gap G should not be 0.) the size of the gap G is preferably set within a range of 10-80% (further preferably, range of 10-50%, and further, range of 20-45%) of the maximum warpage amount of the links 11. By setting the gap of the links as described above, if links 11 which have relatively large warpage are adjacently arranged, these links are brought into contact with each other, and on the other hand, if links 11 which have relatively small warpage are adjacently arranged, these links are not brought into contact with each other. If a link having a large warpage and a link having a small warpage are adjacently arranged, they are brought into slight contact each other occasionally depending on the warpage amounts. As a result, in the chain 1 as a whole, the friction force generated in the chain 1 is much smaller (for example, from one third to one tenth) than a friction force generated in a chain in which every adjacent links are brought into contact with each other. Accordingly, the friction force in serves as a resistance force for damping a vibration against the string vibration of the chain 1. On the other hand, even though the links 11 are partially brought into contact, the contact is not generated entirely on the surfaces of the links 11. Therefore, excessive contact pressure is not generated in the links so that wear of the links is avoided and power transmission efficiency of the chain 1 is not deteriorated significantly.

In the above power transmission chain 1, the pins are repeatedly moved upward and downward, so that polygon vibrations develop, and this is the cause of noises. However, the pins 14 move relative to the respective inter-pieces 15 in rolling contact therewith, and besides the locus of the position of contact between the pin 14 and the inter-piece 15 obtained when using the pin 14 as a reference is the involute line. With this construction, vibrations can be reduced, and noises can be reduced as compared with the case where the contact surfaces of the pin and the inter-piece are both arc-shaped surfaces. Further, when the chain 1 is used in a CVT, each pin 14 and the mating inter-piece 15 are moved in rolling contact with each other, and therefore the pin 14 is hardly rotated relative to the sheave surfaces 2c and 2d of the pulley 2, and a frictional loss is reduced, and a high mechanical efficiency of power transmission is secured.

What is claimed is:

1. A power transmission chain comprising:
    a plurality of links each having front and rear insertion through holes for a passage of pins therethrough;
    a plurality of first pins; and
    a plurality of second pins,
    wherein the first pins and the second pins are arranged in a forward-rearward direction, and interconnect the links arranged in a chain width direction such that the front insertion through hole of one of the links corresponds to the rear insertion through hole of an other of the links,
    wherein the first pins and the second pins move relative to each other in rolling contact with each other so that the links can be bent relative to each other in a chain length direction,
    wherein one of the first pins and the second pins is fixedly fitted in the front insertion through hole of the one of the links and movably fitted in the rear insertion through hole of the other of the links, and an other of the first pins and the second pins is movably fitted in the front insertion through hole of the one of the links and fixedly fitted in the rear insertion through hole of the other of the links,
    wherein a gap with a predetermined size is formed between the plurality of links arranged in the chain width direction, the gap being a design gap that is formed when warpage amounts do not occur in the plurality of links, the design gap being set by positioning and fixing the plurality of links to the pins, and
    wherein the predetermined size of the gap is less than a maximum warpage amount of the plurality of links and is set to be within a range of 10% to 80% of the maximum warpage amount of the plurality of links, the maximum warpage amount of the plurality of links being obtained by measuring warpage amounts of the plurality of links prior to the passage of the pins through the holes of the plurality of links, and choosing a maximum of the measured warpage amounts as the maximum warpage amount.

2. The power transmission chain according to claim 1, wherein the predetermined size of the gap is set to be within a range of 10% to 50% of the maximum warpage amount of the plurality of links.

3. A power transmission chain according to claim 1, wherein the predetermined size of the gap is set to be within a range of 20% to 45% of the maximum warpage amount of the plurality of links.

4. A power transmission apparatus comprising:
    a first pulley having a conical sheave surface;
    a second pulley having a conical sheave surface; and
    a power transmission chain according to claim 1 extending around the first pulley and the second pulley.

* * * * *